(12) United States Patent
Hoshino et al.

(10) Patent No.: US 6,301,047 B1
(45) Date of Patent: Oct. 9, 2001

(54) SYSTEM FOR OPTICALLY IDENTIFYING AN OBJECT

(75) Inventors: Hidekazu Hoshino; Itsuo Takeuchi; Seiya Shibuya, all of Yokohama (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 09/440,683

(22) Filed: Nov. 16, 1999

(51) Int. Cl.⁷ ................................................. G02B 27/44
(52) U.S. Cl. ........................ 359/566; 359/2; 359/572; 359/483; 349/194; 356/71; 250/556
(58) Field of Search ........................ 359/2, 566, 483, 359/485, 502, 573, 569, 572; 349/194; 283/86, 87, 90; 356/71; 250/556

(56) References Cited

U.S. PATENT DOCUMENTS 5,442,433 * 8/1995 Hoshino et al. .................. 356/71
6,034,753 * 3/2000 Li et al. ............................. 349/194
6,061,122 * 3/2000 Hoshino et al. .................. 356/71

FOREIGN PATENT DOCUMENTS 4-144796   5/1992 (JP).

* cited by examiner

Primary Examiner—Cassandra Spyrou
Assistant Examiner—Fayez Assaf
(74) Attorney, Agent, or Firm—Marger Johnson & McCollom, P.C.

(57) ABSTRACT

The object to be identified is affixed with an identification medium comprising a reflective layer consisting of a reflective hologram or diffraction grating. The high polymer cholesteric liquid crystal provides an inexpensive identification medium, and the use of the second light receiving unit for providing a reference signal provides a high S/N output signal which is highly distinct and resistant to the contamination of the identification medium. Also, the elimination of the need for expensive optical elements such as beam splitters also contributes to the reduction of cost.

9 Claims, 14 Drawing Sheets

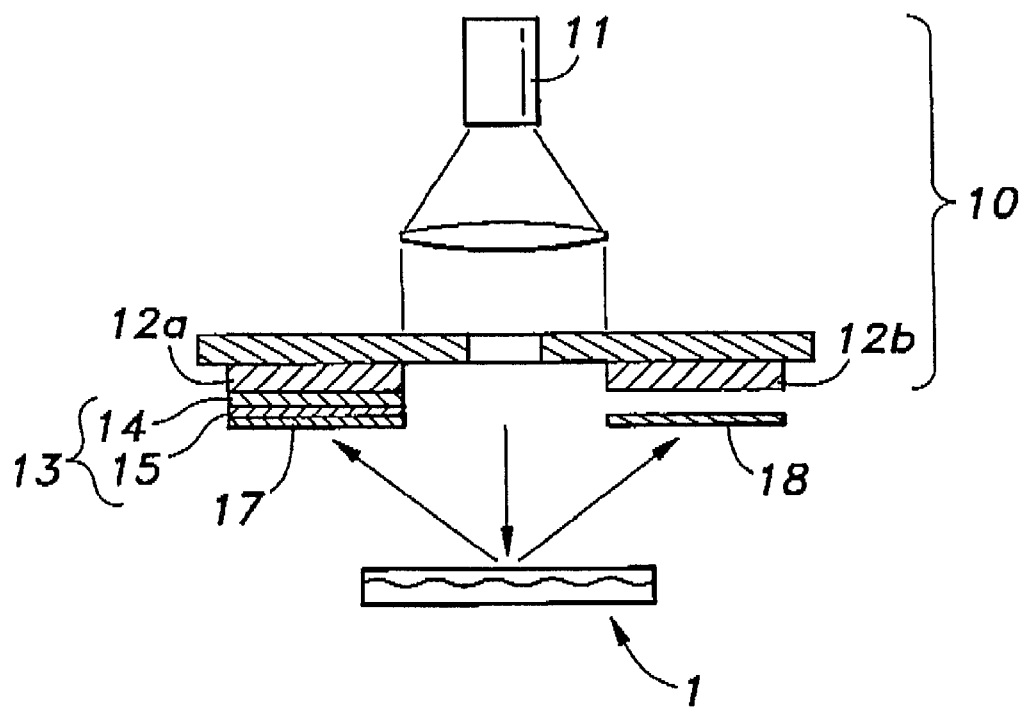
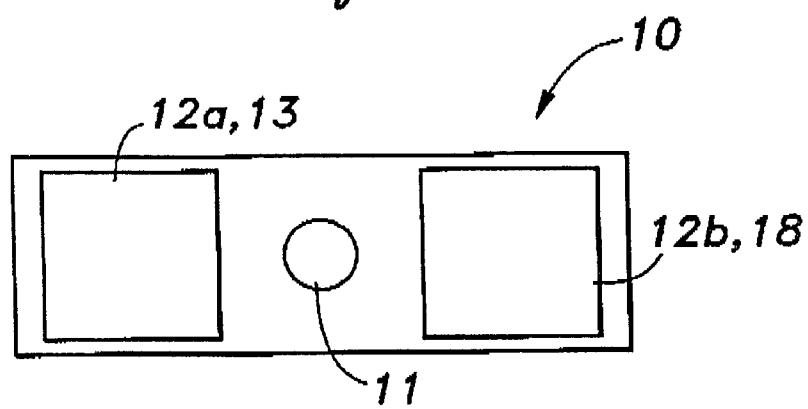

SYSTEM FOR OPTICALLY IDENTIFYING AN OBJECT

TECHNICAL FIELD

The present invention relates to a system for preventing forgery of two-dimensional and three-dimensional objects such as passports, cards, security notes, gift certificates, pictures, public transportation tickets, and betting tickets, and in particular to a system for verifying the authenticity of an object by optically and mechanically recognizing a security medium affixed to the object.

BACKGROUND OF THE INVENTION

Conventionally, the use of cholesteric liquid crystal layers for identifying cards and security notes has been known. Cholesteric liquid crystals normally have a layered structure, and the axial directions of the molecules in each layer are parallel to each other as well to the plane of each layer. Each layer is slightly twisted relative to the adjacent layer so that a three-dimensional spiral structure is produced. This structure demonstrates the property to selectively reflect a circularly polarized light having a wavelength of $\lambda$ which is given by $\lambda = n-p$ where p is the depth of the layers for this axial direction to turn 360 degrees or the pitch, and n is the average index of refraction of each layer. Therefore, if the direction of the liquid crystals in each layer turns counter-clockwise with respect to the incident light, the left-handed circularly polarized component of the incident light having the wavelength of $\lambda$ is reflected while the right-handed circularly polarized component passes through. The light having any other wavelength passes through. For instance, when a cholesteric liquid crystal material having a property to reflect red light having the wavelength of $\lambda_R$ is placed on a material which absorbs light in the visible range, and a random light such as sunlight is radiated thereon, the transmitted light is all absorbed, and only a left-handed circularly polarized light having the wavelength of $\lambda_R$ is reflected.

For instance, Japanese patent laid-open publication (kokai) No. 4-144796 discloses a system in which random light is radiated upon a cholesteric liquid crystal layer, and the reflected circularly polarized light is passed through a band pass filter and a quarter-wave plate to convert the incident light into a linearly polarized light. The linearly polarized light is divided by a beam splitter, and a right-handed circularly polarized light or a left-handed circularly polarized light is detected by using a suitable polarizing plate.

However, when reflected light is used for identification purpose, the surface contamination and/or irregular reflection from the background may cause noises which are significant enough to impair the reliability of the system. Also, the reliance on the simple use of a liquid crystal layer may not be effective enough because duplication or forgery is relatively easy. To individually detect a right-handed or left-handed circularly polarized light, an expensive beam splitter is required. This leads to an increase in the number of necessary components, in the size of the system, and in the overall cost.

It has also been proposed to affix a hologram on the surface of an object and to identify the authenticity of the object by visually identifying it. It has also been proposed, to eliminate the possible uncertainty associated with visual identification, to use a hologram or diffraction grating having a specific diffractive property, impinge a light beam having a prescribed wavelength upon the hologram, and determine the authenticity of the object by comparing the intensity of the light diffracted onto a prescribed position with the intensity of the light obtained at a different position, However, due to the recent popularization of the technology of preparing hologram, the hologram technology has become so readily available that illicit duplication of hologram which is hardly distinguishable from an authentic hologram can now be made without any significant difficulty. In other words, the hologram has become less effective in discouraging illicit duplication. A light beam diffracted by a hologram or diffraction grating is typically detected by comparing its intensity with the intensity of a light beam obtained elsewhere and determining if the difference is greater than a prescribed threshold level or not. However, because of the need for an additional light receiving unit to be placed at a position other than that for the diffracted light beam, an increase in both size and cost was unavoidable. Also, any irregular reflection and/or insufficient reflection due to surface contamination could cause detection errors.

Other technologies for preventing forgery are known, but are so costly that they are not suitable for use on common commercial goods. Thus, there is a need for a novel technology for preventing forgery.

BRIEF SUMMARY OF THE INVENTION

In view of such problems of the prior art, a primary object of the present invention is to provide an optical identification system which is highly difficult to illicitly duplicate.

A second object of the present invention is to provide an optical identification system which is capable of producing highly distinct results, and hence is highly reliable in use.

A third object of the present invention is to provide an optical identification system which is economical enough to be affixed to inexpensive commercial goods.

A fourth object of the present invention is to provide an optical identification system which uses durable identification media highly resistant to contamination.

According to the present invention such objects can be accomplished by providing a system for optically identifying the authenticity of an object, comprising: a diffraction grating affixed to an object, the diffraction grating comprising a high polymer cholesteric liquid crystal layer for a reflective layer of the diffraction grating; a light source for impinging an incident light beam onto the diffraction grating; a first light receiving unit placed at a position for receiving a diffracted light beam from the diffraction grating and providing an output signal; a circularly polarizing filter placed between the first light receiving unit and the diffraction grating; and a second light receiving unit placed at a different position for receiving a diffracted light beam from the diffraction grating and providing a reference signal therefrom.

The high polymer cholesteric liquid crystal provides an inexpensive identification medium, and the use of the second light receiving unit for providing a reference signal provides a high S/N output signal which is highly distinct and resistant to the contamination of the identification medium. Also, the elimination of the need for expensive optical elements such as beam splitters also contributes to the reduction of cost.

When a second circularly polarizing filter of an opposite sense is placed between the second light receiving unit and the diffraction grating, an even more distinct output signals can be obtained, and the security of the system can be enhanced. Also, distinct output signals can be obtained also by the use of a second pair of light receiving units placed at positions for receiving diffracted light beams from the diffraction grating, and a circularly polarizing filter of an opposite sense placed between only one of the second pair of light receiving units and the diffraction grating, or a pair of circularly polarizing filter of mutually opposite senses each placed between a corresponding one of the second pair of light receiving units and the diffraction grating, as the case may be. The use of band pass filters also contributes to producing distinct outputs.

To enhance the effectiveness in the security of the system, the two pairs of light receiving units may be adapted to simultaneously receive diffracted light from a common spot in the diffraction grating. The security of the system can be also enhanced by placing an additional circularly polarizing filter between the light source and the diffraction grating.

The diffraction grating may comprises small regions having at least two different diffractive properties, the small regions being sized and distributed so that a plurality of regions including those of different diffractive properties may be simultaneously accessed by each of the light receiving units. This also enhances the security of the system.

The high polymer cholesteric liquid crystal material used for the present invention should be capable of retaining a shape as a solid substance, and should have a molecular weight which is required to be used as a reflective layer in a hologram or diffraction grating. The high polymer cholesteric liquid crystal material has an optical property which is highly stable when exposed to a magnetic field, electric field and temperature, as opposed to the low polymer cholesteric liquid crystal material.

BRIEF DESCRIPTION OF THE DRAWINGS

Now the present invention is described in the following with reference to the appended drawings, in which:

FIG. 3 is a simplified longitudinal view of a second embodiment of the present invention;

FIG. 4 is a bottom view of the identification device shown in FIG. 3;

DETAILED DESCRIPTION OF THE PREFERRED EMBODIMENTS

Figure 1:
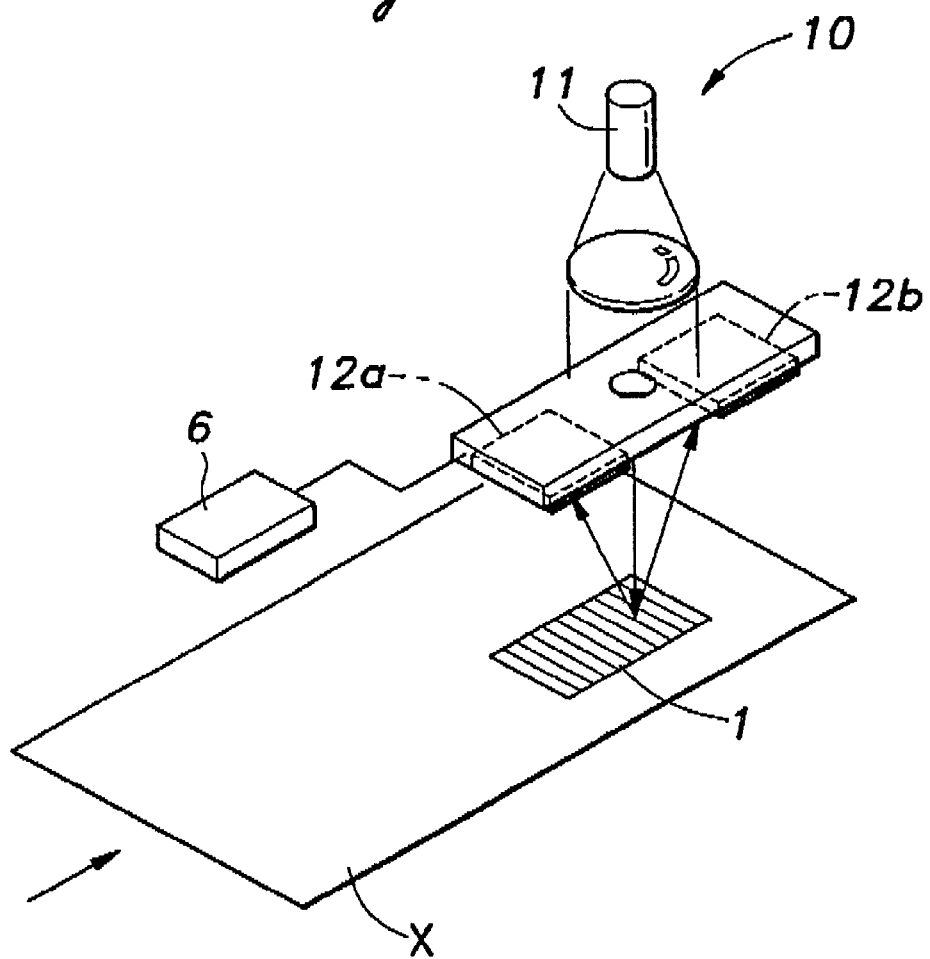
FIG. 1 is a perspective view of an optical identification system embodying the present invention.

FIG. 1 is a perspective view of an identification system embodying the present invention which comprises a hologram foil 1 serving as an identification medium 1 and an identification device 10. The hologram foil 1 may be affixed to a selected location, two or more locations or the entire surface of an object X such as a card, passport, security note or gift certificate, by a hot stamping process. The hot stamping process consists of transferring an ornamental film onto the surface of an article with an instantaneous application of heat and pressure.

Figure 2:
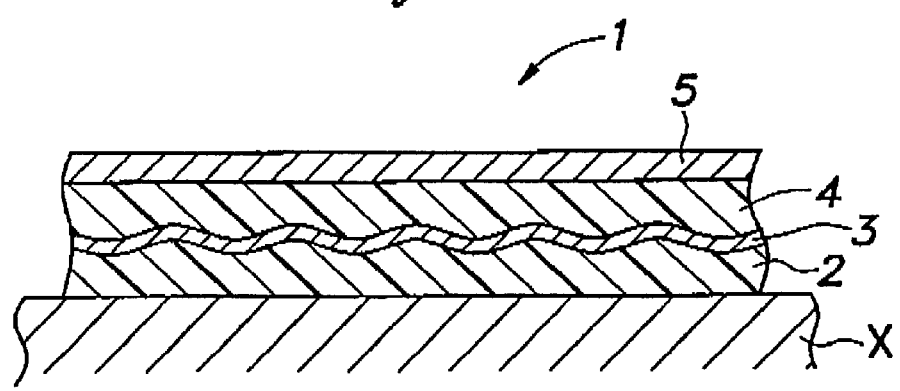
FIG. 2 is a sectional view of the identification medium for the optical identification system according to the present invention.

As shown in FIG. 2, the hologram foil 1 is formed by laminating a bonding layer 2 for the surface of an object X, a high-polymer cholesteric liquid crystal layer 3 serving as a reflective layer, a hologram forming layer 4 and a protective layer 5, and is adapted to be transferred onto the object X by the protective layer 5 serving as a peel layer separating it from a base film not shown in the drawing by heat and pressure during the hot stamping process.

Referring also to FIGS. 3 and 4, the identification device 10 is provided with a centrally located light source 11 for emitting a random light beam, and a pair of light receiving units 12a and 12b located at symmetric positions with respect to the light source 11. A circularly polarizing filter 13 consisting of a polarizing filter 14 and a quarter-wave plate 15 is placed between the hologram foil 1 and one of the light receiving units 12a at the time of identification or only in front of one of the light receiving units 12a. Additionally, a pair of band pass filters 17 are 18 for passing only light of a prescribed wavelength, for instance only green light, are placed in front of the circularly polarizing filter 13 of one of the light receiving units 12a and in front of the other light receiving unit 12b. These band pass filters 17 and 18 are optional, and improve the identification performance particularly in environments where a light source of a special wavelength is employed or where noises of prescribed wavelengths are required to be eliminated. The two light receiving units 12a and 12b are adapted to individually detect the received light, and the output signals thereof are forwarded to a control unit 16 for processing these output signals (see FIG. 1).

In this embodiment, the identification device 10 is stationary white the object X is transported in the direction indicated by the arrow in FIG. 1 so that the identification device 10 may scan the hologram foil 1. The hologram foil 1 may also consist of diffraction grating, and the term "diffraction grating" as used in the claims of this application should be understood as covering hologram, diffraction grating and any other optical elements which demonstrate a selective reflective directivity produced by making use of optical diffraction.

In this hologram foil 1, the grid lines extend perpendicularly to the direction of transportation or scanning so that the incident light directed perpendicularly to the foil surface is diffracted obliquely in the fore-and-aft direction of the scanning direction, and symmetrically with respect to the optical center line of the incident light beam. The light receiving units 12a and 12b are arranged along the scanning direction so as to capture the diffracted light beams.

For practical purposes, the direction of the grid lines of the hologram foil 1 as well as the positions of the light receiving units 12a and 12b can be arbitrarily selected as long as the light receiving units 12a and 12b are arranged so as to be symmetric to each other with respect to the light source 11 and to capture the diffracted light beams. However, if the arrangement is such that the incident light beam impinging upon the hologram foil 1 from a perpendicular direction is diffracted laterally with respect to the scanning direction, it may be relatively easy to simulate the diffraction with other optical elements such as mirrors and prisms. On the other hand, it is extremely difficult to build an arrangement which can simulate a diffraction grating which diffracts the incident light beam in the fore-and-aft directions with respect to the scanning direction substantially over the entire scanning length, and to arrange the light receiving units accordingly. Therefore, the latter arrangement is more preferable.

In the various embodiments described in this application, two different patterns are placed under consideration. According to the first pattern, the high polymer cholesteric liquid crystal layer 3 of the hologram foil 1 reflects only right-handed circularly polarized light, and the circularly polarizing filter 13 transmits only right-handed circularly polarized light while shutting off left-handed circularly polarized light. According to the second pattern, the high polymer cholesteric liquid crystal layer 3 of the hologram foil 1 likewise reflects only right-handed circularly polarized light, but the circularly polarizing filter 13 transmits only left-handed circularly polarized light while shutting off right-handed circularly polarized light. The mode of operation of these patterns is described in the following. The right and left senses in the circular polarization of the first and second patterns are mutually interchangeable, and description of such obvious variations is omitted. However, various other combinations of the right and left senses in the circular polarization of the first and second patterns should be understood as being included in the overall all concept and spirit of the present invention.

Figure 5:
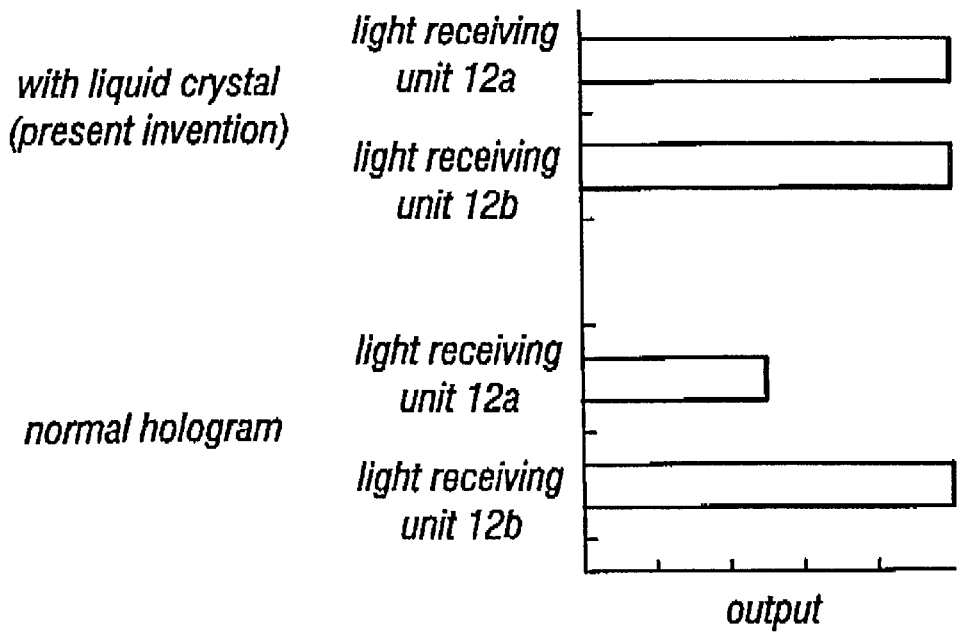
FIG. 5 is a graph showing the output signals from the identification device of FIG. 4 according to the first pattern.

According to the first pattern where the high polymer cholesteric liquid crystal layer 3 of the hologram foil 1 reflects only right-handed circularly polarized light, and the circularly polarizing filter 13 transmits only right-handed circularly polarized light while shutting off left-handed circularly polarized light, as the object X is transported and the hologram foil 1 is scanned, because the light diffracted onto the light receiving unit 12a is not prevented, the intensity A of the light received by the light receiving unit 12a is substantially equal to the intensity B of the light received by the other light receiving unit 12b (A/B=1). When the hologram or diffraction grating is not provided with a high polymer cholesteric liquid crystal layer, because the left-handed circularly polarized component of the light diffracted to the light receiving unit 12a is shut off, the intensity A of the light received by the light receiving unit 12a is only about one half the intensity B of the light received by the other light receiving unit 12b (A/B≈½). Therefore, the authenticity of the object can be readily determined. The intensities of the light received by the light receiving units 12a and 12b in this case are indicated in Fig. 5. Obviously, when the light is reflected by normal optical elements, the reflected light would not be normally received by the light receiving units 12a and 12b. Even if the light is directed to the light receiving units 12a and 12b by using mirrors and prisms and properly adjusting their angles, as was the case with the hologram or diffraction grating having no high polymer cholesteric liquid crystal layer, the left-handed circularly polarized component of the light reflected to the light receiving unit 12a is shut off so that the intensity A of the light received by the light receiving unit 12a is only about one half the intensity B of the light received by the other light receiving unit 12b (A/B=½). The intensities of the light received by the light receiving units 12a and 12b in this case are also indicated in FIG. 5. As one can readily appreciate, this equally applies to other embodiments described below, and, therefore, any further discussion on any attempts to simulate the present invention with optical elements, instead of a hologram foil 1 affixed to the object X, is omitted.

Figure 6:
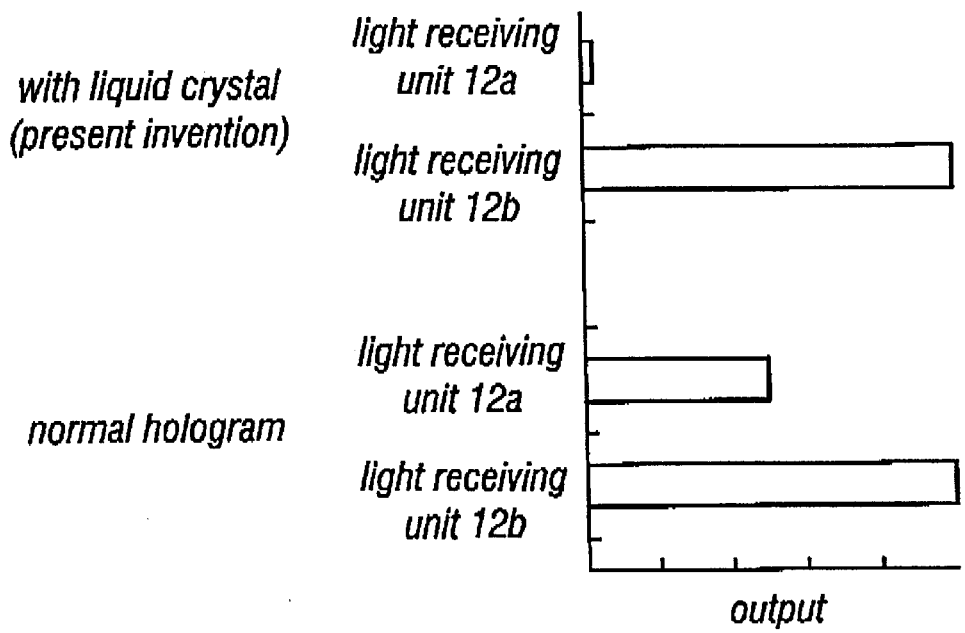
FIG. 6 is a graph showing the output signals from the identification device of FIG. 4 according to the second pattern.

According to the second pattern where the high polymer cholesteric liquid crystal layer 3 of the hologram foil 1 likewise reflects only right-handed circularly polarized light, but the circularly polarizing filter 13 transmits only left-handed circularly polarized light while shutting off right-handed circularly polarized light, as the object X is transported and the hologram foil 1 is scanned, because the light diffracted onto the light receiving unit 12a is shut off, the intensity A of the light received by the light receiving unit 12a is significantly smaller than the intensity B of the light received by the other light receiving unit 12b (AB=0) as shown in the graph of FIG. 6. When the hologram or diffraction grating is not provided with a high polymer cholesteric liquid crystal layer, because the right-handed circularly polarized component of the light diffracted to the light receiving unit 12a is shut off, the intensity A of the light received by the light receiving unit 12a is only about one half the intensity B of the light received by the other light receiving unit 12b (A/B≈½). The intensities of the light received by the light receiving units 12a and 12b in this case are also indicated in FIG. 6. Therefore, the authenticity of the object can be readily determined.

Figure 7:
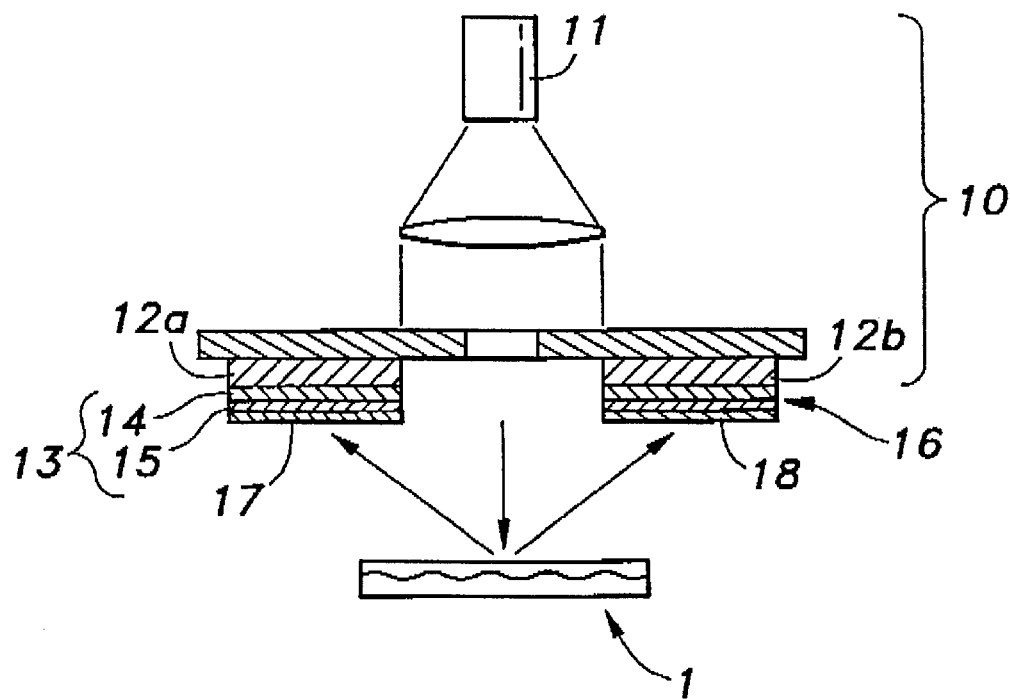
FIG. 7 is a simplified longitudinal view of a second embodiment of the present invention.

The circularly polarizing filter was provided on only one of each pair of light receiving units in the above described embodiments but it is also possible to provide circularly polarizing filters of opposite senses on corresponding ones of each pair of light receiving units and effect a similar identification process. Referring to FIG. 7 showing a second embodiment of the present invention, the light receiving unit 12a is provided with a first circularly polarizing filter 13, and the other light receiving unit 12b is provided with a second circularly polarizing filter 16 of an opposite sense. In other words, the circularly polarizing filter 13 shuts of the left-handed circularly polarized light (first pattern) while the second circularly polarizing filter 16 placed in front of the light receiving unit 12b shuts of the right-handed circularly polarized light (second pattern). In this case, the intensity A of the light received by the light receiving unit 12a is significantly smaller than the intensity B of the light received by the other light receiving unit 12b (A/B≈0). When a hologram or diffraction grating not provided with a high polymer cholesteric liquid crystal layer is used, because the right-handed circularly polarized light is shut off from the light receiving unit 12a, and the left-handed circularly polarized light is shut off from the light receiving units 12b so that the intensity A of the light received by the light receiving units 12a is substantially equal to the intensity B of the light received by the light receiving unit 12b (A/B=1). This equally applies to other embodiments.

Figure 8:
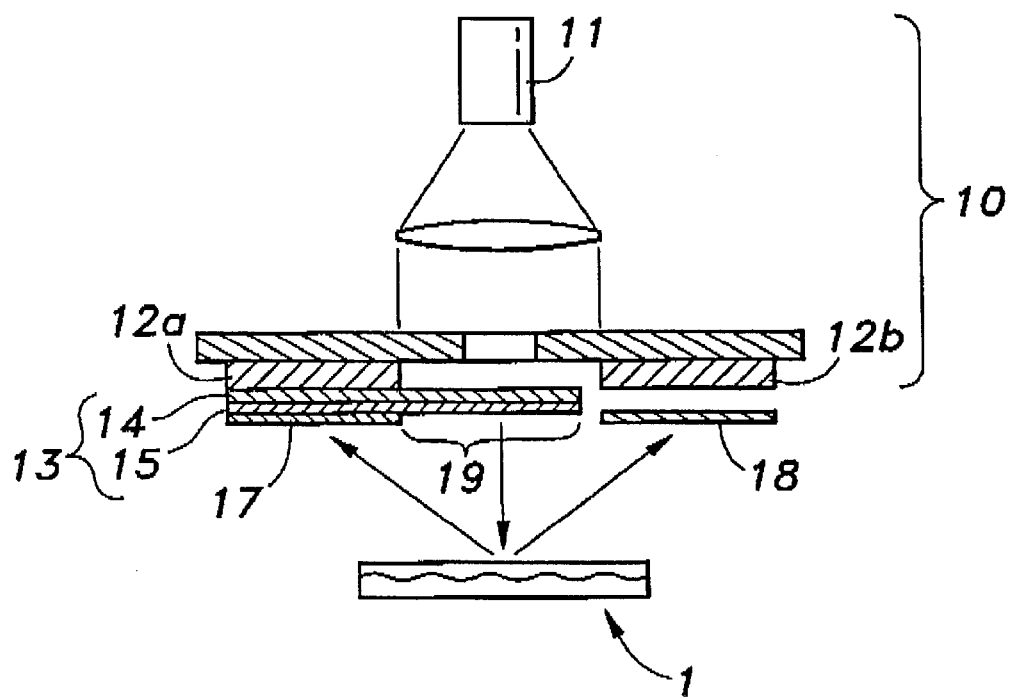
FIG. 8 is a simplified longitudinal view of a third embodiment of the present invention.
Figure 9:
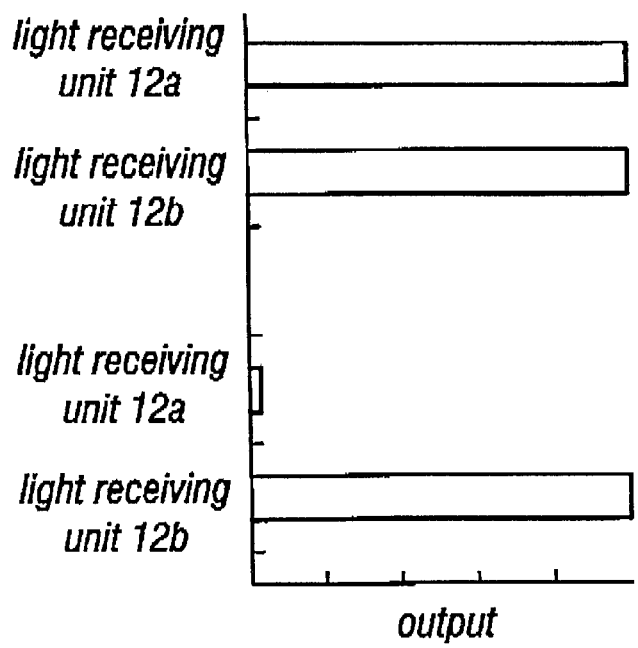
FIG. 9 is a graph showing the output signals from the identification device of FIG. 8 according to the first pattern.

Referring to FIG. 8 showing a third embodiment of the present invention, as a possible modification of the above described embodiment, in the case of the first pattern where the circularly polarizing filter 13 transmits only the right-handed circularly polarized light while shutting off the left-handed circularly polarized light, the light source 11 may be turned into the right-handed circularly polarized light by placing a circularly polarizing filter 19, which transmits only the right-handed circularly polarized light, and shuts off the left-handed circularly polarized light, between the hologram foil 1 and the light source 11. In this case, as the object X is transported and the hologram foil 1 is scanned, because the diffracted light directed to the light receiving unit 12a is not shut off, the intensity A of the light received by the light receiving unit 12a is substantially equal to the intensity B of the light received by the other light receiving unit 12b (A/B=1). In this embodiment, the circularly polarizing filter 19 consists of an integral extension of the circularly polarizing filter 13 for the first light receiving unit 12a. When the hologram or diffraction grating is not provided with a high polymer cholesteric liquid crystal layer, because the diffraction grating converts the incident right-handed circularly polarized light into left-handed circularly polarized light, and the diffracted light directed to the light receiving unit 12a is therefore totally shut off, the intensity A of the light received by the light receiving unit 12a is significantly smaller than the intensity B of the light received by the other light receiving unit 12b (A/B≈0). Therefore, the authenticity of the object can be readily determined. The intensities of the light received by the light receiving units 12a and 12b in this case are indicated in FIG. 9.

Figure 10:
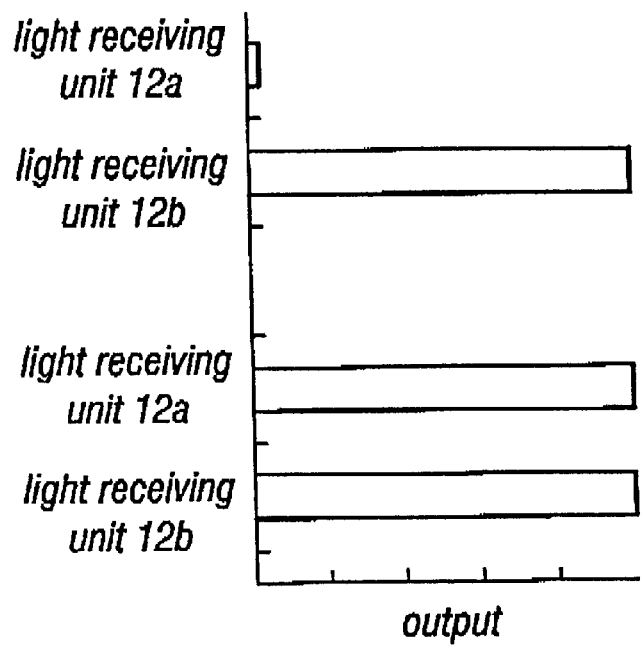
FIG. 10 is a graph showing the output signals from the identification device of FIG. 8 according to the second pattern.

In the case of the second pattern where the circularly polarizing filter 13 transmits only the left-handed circularly polarized light while shutting off the right-handed circularly polarized light, the light source may be likewise turned into the right-handed circularly polarized light. Therefore, the circularly polarizing filter 16 for the light source must be provided separately from the circularly polarizing filter 13 for the first light receiving unit 12a. In this case, as the object X is transported and the hologram foil 1 is scanned, because the diffracted light directed to the light receiving unit 12a is totally shut off, the intensity A of the light received by the light receiving unit 12a is significantly smaller than the intensity B of the light received by the other light receiving unit 12b (A/B≈0). When the hologram or diffraction grating is not provided with a high polymer cholesteric liquid crystal layer, because the diffracted light is turned into left-handed circularly polarized light, and the diffracted light directed to the light receiving unit 12a is therefore not shut off, the intensity A of the light received by the light receiving unit 12a is substantially equal to the intensity B of the light received by the other light receiving unit 12b (A/B=1). Therefore, the authenticity of the object can be readily determined. The intensities of the light received by the light receiving units 12a and 12b in this case are indicated in FIG. 10.

If the light source consists of left-handed circularly polarized light and the high polymer cholesteric liquid crystal layer 3 reflects only left-handed circularly polarized light, the output results of the first pattern and the second pattern are simply reversed.

Thus, when the light source consists of circularly polarized light, instead of random light, the difference between the outputs of the two light receiving units 12a and 12b is amplified, and the S/N ratio of the output is increased. Therefore, a more reliable detection is made possible without being interfered by contamination. The same is true with the following embodiments although exhaustive description of such combinations are omitted from description.

Figure 11:
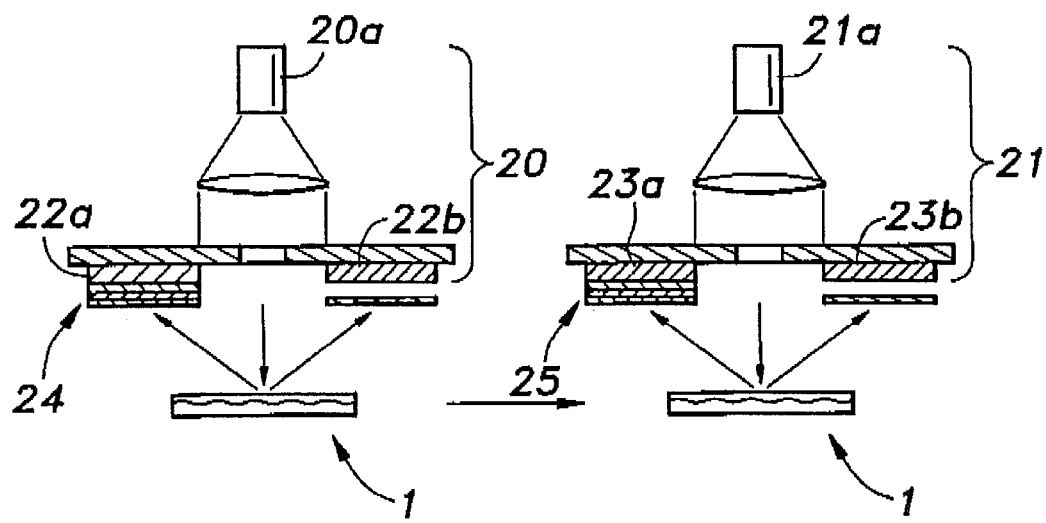
FIG. 11 is a simplified longitudinal view of a fourth embodiment of the present invention.
Figure 12:
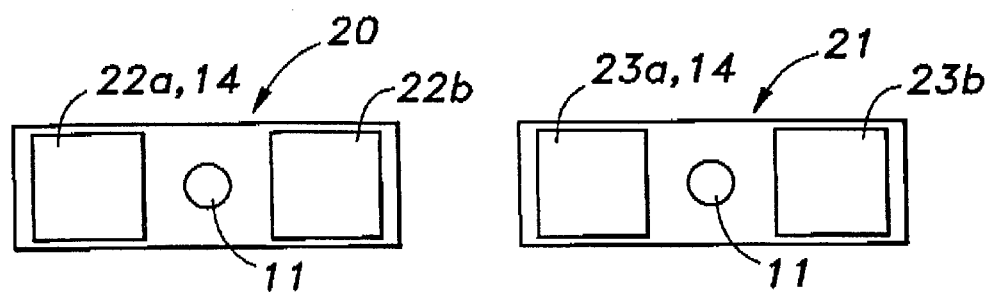
FIG. 12 is a bottom view of the identification device shown in FIG. 11.

FIGS. 11 and 12 show a fourth embodiment of the present invention. In this embodiment, an identification device 20 based on the first pattern where only the right-handed circularly polarized light is transmitted while the left-handed circularly polarized light is shut off, and another identification device 21 based on the second pattern where only the left-handed circularly polarized light is transmitted while the right-handed circularly polarized light is shut off are arranged in series along the scanning direction so that the identification action may occur sequentially. The two identification devices 20 and 21 in this case are provided with separate light sources 20a and 21a, respectively. The high polymer cholesteric liquid crystal layer 3 reflects only the right-handed circularly polarized light. In this case, as an identification process is executed by the identification device 20 while the object X is transported and the hologram foil 1 is thereby scanned, the diffracted light directed to the light receiving unit 22a is not shut off by the circularly polarizing filter 24 so that the intensity A of the light received by the light receiving unit 22a is substantially equal to the intensity B of the light received by the other light receiving unit 22b (A/B=1). As an identification process is thereafter executed by the other identification device 21, the diffracted light directed to the light receiving unit 23a is totally shut off by the circularly polarizing filter 25 so that the intensity C of the light received by the light receiving unit 23a is significantly smaller than the intensity D of the light received by the other light receiving unit 23b (C/D≈0).

When the hologram or diffraction grating is not provided with a high polymer cholesteric liquid crystal layer, because the right-handed circularly polarized component of the diffracted light to the light receiving unit 22a and the left-handed circularly polarized component of the diffracted light to the light receiving unit 23a are both shut off, the intensity A of the light received by the light receiving unit 22a is only about half the intensity B of the light received by the other light receiving unit 22b (A/B≈½) while the intensity C of the light received by the light receiving unit 23a is only about half the intensity D of the light received by the other light receiving unit 23b (C/D≈½). The authenticity of the object can be determined from these results.

It is also possible to find (A−C):(A+C) from the intensities A and C of light received by the light receiving units 22a and 23a, respectively, and use this ratio for the determination of the authenticity. Such a process can be executed in the control unit 6 illustrated in FIG. 1. In case of a hologram or diffraction grating provided with a high polymer cholesteric liquid crystal layer (A−C):(A+C)≈1:1 because A=1 and C≈0. On the other hand, in case of a hologram or diffraction grating lacking a high polymer cholesteric liquid crystal layer (A−C):(A+C)≈1: X (X is a certain small number substantially smaller than ½ which depends on the measured value) because A≈C with the right-handed circularly polarized component in the diffracted light directed to the light receiving unit 22a and the left-handed circularly polarized component in the diffracted light directed to the light receiving unit 23a both shut off. The authenticity of the object can be particularly distinctly determined from these results.

It is also conceivable, with an intent to simulate an authentic hologram foil 1, to use a hologram or diffraction grating in which each of the grids of the diffraction grating is formed in the shape of a saw tooth so that one side of the saw tooth is parallel to the incident light and the other side is inclined, and the diffracted light may be substantially entirely directed to the light receiving units 22b and 23b. In this case, even though the intensity C of the light received by the light receiving unit 23a is significantly smaller than the intensity D of the light received by the other light receiving unit 23b (C/D≈0), the intensity A of the light received by the light receiving unit 22a is significantly smaller than the intensity B of the light received by the other light receiving unit 22b (A/B≈0) so that the determination of the authenticity of the hologram foil 1 can be readily accomplished. Also when the hologram or diffraction grating is constructed in such a manner that the diffracted light may be substantially entirely directed to the light receiving unit 22a and 23a, even though the intensity A of the light received by the light receiving unit 22a is substantially equal to the intensity B of the light received by the other light receiving unit 22b (A/B=1), because the intensity C of the light received by the light receiving unit 23a is also substantially equal to the intensity B of the light received by the other light receiving unit 23b (C/D=1), the authenticity of the hologram foil 1 can be again readily determined. Such an arrangement for adjusting the intensity of light for each direction of diffraction requires a special technology and a high cost in forming the saw-teeth shaped grids for the diffraction grating. However, any one of the embodiments of the present invention can readily detect such an arrangement because of the use of the polarized light for identification.

Figure 13:
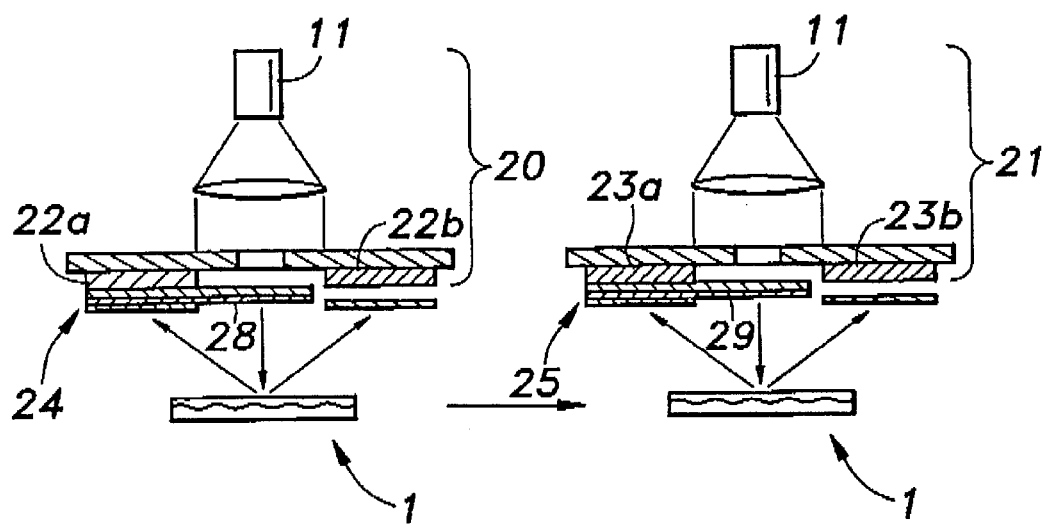
FIG. 13 is a simplified longitudinal view of a fifth embodiment of the present invention.

FIG. 13 shows a fifth embodiment of the present invention. A circularly polarizing filter 28 which transmits only the right-handed circularly polarized light while shutting off the left-handed circularly polarized light is interposed between the hologram foil 1 and the light source 20a of a first identification device 20 based on the first pattern where the circularly polarizing filter 24 transmits only the right-handed circularly polarized light, and shuts off the left-handed circularly polarized light. Also, a circularly polarizing filter 29 which transmits only the left-handed circularly polarized light while shutting off the right-handed circularly polarized light is interposed between the hologram foil 1 and the light source 21a of a second identification device 21 based on the second pattern where the circularly polarizing filter 25 transmits only the left-handed circularly polarized light, and shuts off the right-handed circularly polarized light. The high polymer cholesteric liquid crystal layer 3 of the hologram foil 1 reflects only the right-handed circularly polarized light. In this case, as the object X is transported and the hologram foil 1 is scanned, because the light from the light source 20a consists of right-handed circularly polarized light, the diffracted light directed to the light receiving unit 22a is not shut off by the circularly polarizing filter 24, and the intensity A of the light received by the light receiving unit 22a is substantially equal to the intensity B of the light received by the other light receiving unit 22b (A/B=1). As the other identification device 21 executes an identification process, because the light from the light source 21a consists only of the left-handed circularly polarized light, no diffracted light is emitted from the hologram foil 1, and the intensity C of the light received by the light receiving unit 23a and the intensity D of the light received by the other light receiving unit 23b are both substantially zero (C≈0, D≈0). The authenticity of the object can be readily determined from these results.

When the hologram or diffraction grating is not provided with a high polymer cholesteric liquid crystal layer, during the identification process at the identification device 20, because the right-handed circularly polarized light emitted from the light source 20a turns into left-handed circularly polarized light as it is diffracted, the circularly polarizing filter 24 substantially shuts off the diffracted light directed to the light receiving unit 22a so that the intensity A of the light received by the light receiving unit 22a is significantly smaller than the intensity B of the light received by the other light receiving unit 22b (A/B=0). During the subsequent identification process at the identification device 21, because the left-handed circularly polarized light emitted from the light source 21a turns into right-handed circularly polarized light as it is diffracted, the diffracted light directed to the light receiving unit 23a is substantially shut off by the circularly polarizing filter 25 so that the intensity C of the light received by the light receiving unit 23a is significantly smaller than the intensity D of the light received by the other light receiving unit 23b (C/D≈0). The authenticity of the object can be readily determined from these results.

Even when the identification process is executed by using only one identification device having only one light source as was the case with the second embodiment, the S/N ratio of the output signal can be raised as mentioned earlier by using a light source for producing right-handed circularly polarized light. When a transparent tape is affixed to the surface of the hologram or diffraction grating not provided with a high polymer cholesteric liquid crystal layer so as to produce a half-wave phase difference, because the diffracted light consists of right-handed circularly polarized light in the same way as the hologram or the diffraction grating is provided with a high polymer liquid crystal layer so that the output is not different from that would be obtained from the hologram foil 1 of the present invention. However, when a plurality of identification devices having light sources of circularly polarized light of opposite senses are used, it is possible to detect a use of a plastic tape which causes a half-wave phase difference while maintaining a high S/N ratio.

Figure 14:
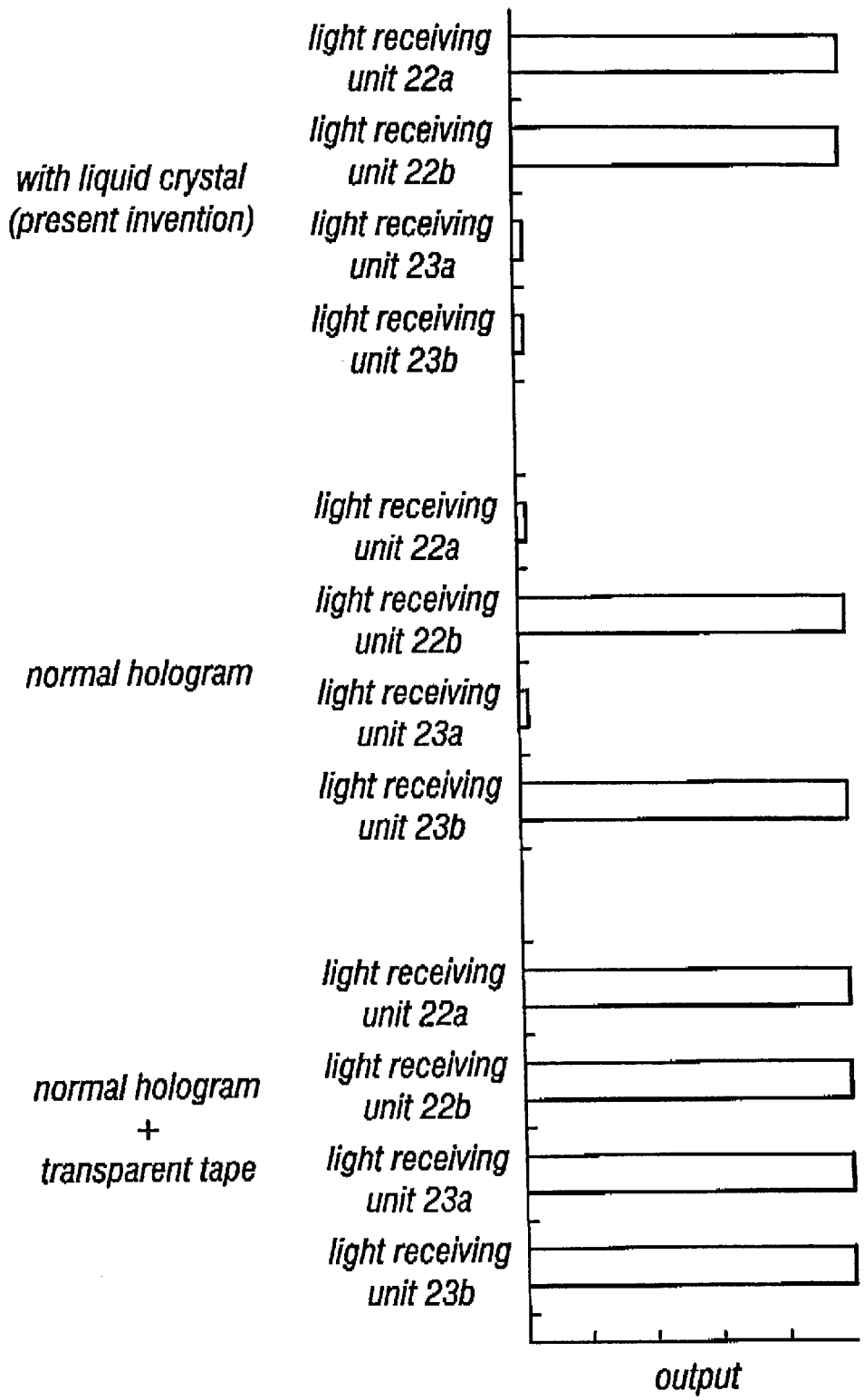
FIG. 14 is a graph showing the output signals from the identification device of FIG. 13 according to the second pattern.

More specific explanation is given in the following in connection with the arrangement illustrated in FIG. 13. Suppose that a transparent plastic tape for causing a half-wave phase difference is placed over the surface of the hologram or diffraction grating lacking a high polymer cholesteric liquid crystal layer. During the identification process by the identification device 20, because the right-handed circularly polarized light from the light source 20a is diffracted without any rotation, the intensity A of the light received by the light receiving unit 22a is substantially equal to the intensity B of the light received by the other light receiving unit 22b (A/B≈1). During the subsequent identification process by the identification device 21, because the left-handed circularly polarized light from the light source 21a is diffracted without any rotation, the intensity C of the light received by the light receiving unit 23a is substantially equal to the intensity D of the light received by the other light receiving unit 23b (C/D≈1). These results are different from those obtained when the hologram foil 1 of the present invention is used so that the authenticity of the object can be readily determined. The intensities of the light received by the light receiving units 22a, 22b, 23a and 23b in this case are indicated in FIG. 14.

A pair of sensors having an identical structure are used in the above described embodiment, and this is more economical than using a pair of sensors having different strictures.

The improvement of the S/N ratio by using the circularly polarized light for the light source can be also effected in the embodiments described hereinafter. Such arrangements are all within the purview of the present invention although description of the specific arrangements and the resulting advantages are omitted in the following description.

Figure 15:
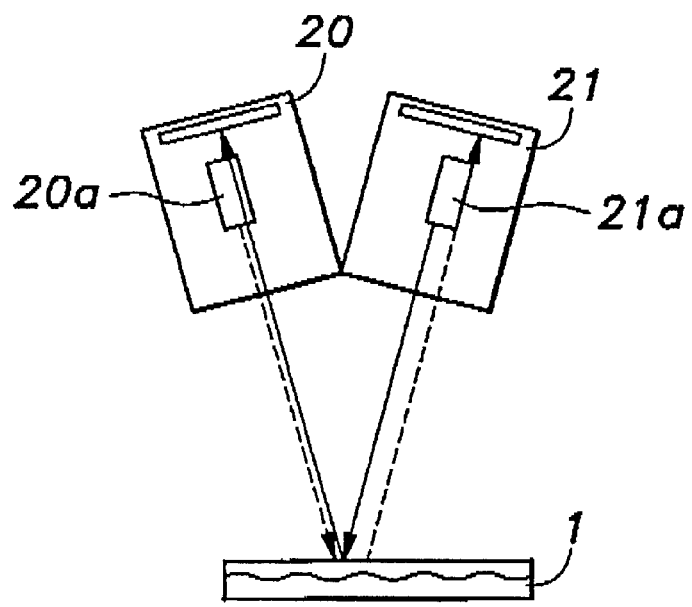
FIG. 15 is a simplified front view of a sixth embodiment of the present invention.
Figure 16:
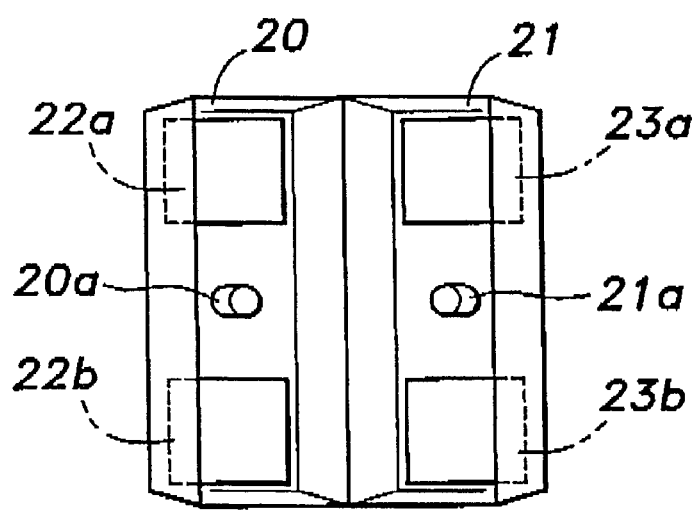
FIG. 16 is a bottom view of the identification device shown in FIG. 15.

According to the above embodiments using two identification devices, the identification process was sequentially executed by the first identification device 20 and the second identification device 21 with a certain time lag. Therefore, it is conceivable that an attempt may be made to deceive the identification system by changing the identification medium during the process. It can be avoided by a sixth embodiment illustrated in FIGS. 15 and 16 in which a pair of identification devices 20 and 21 are arranged in slanted orientations so that the incident light beam from each of the light sources 20a and 21a may be directed to the other light receiving unit, and the diffracted light beams may be simultaneously received by the light receiving units 22a, 22b, 23a and 23b of the other identification devices 20 and 21. This modification can be applied also to the embodiments described in the following.

Figure 17:
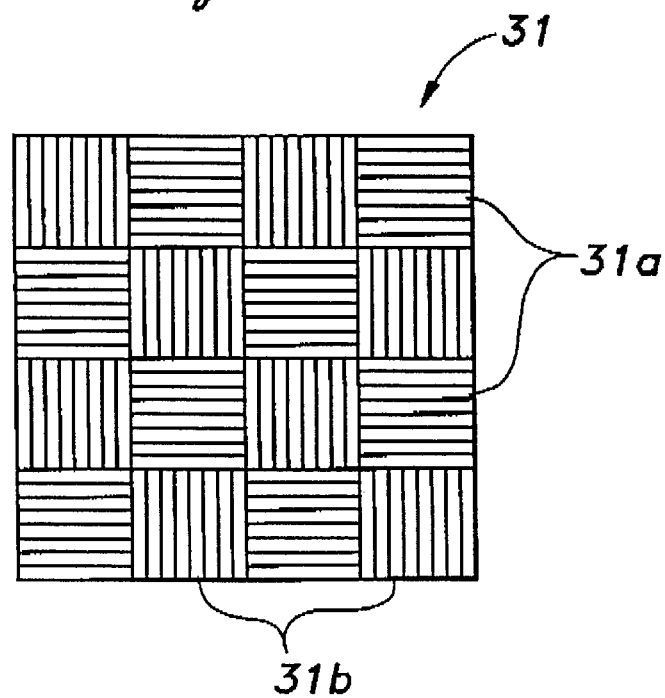
FIG. 17 is a plan view of an identification medium for a seventh embodiment of the present invention.
Figure 18:
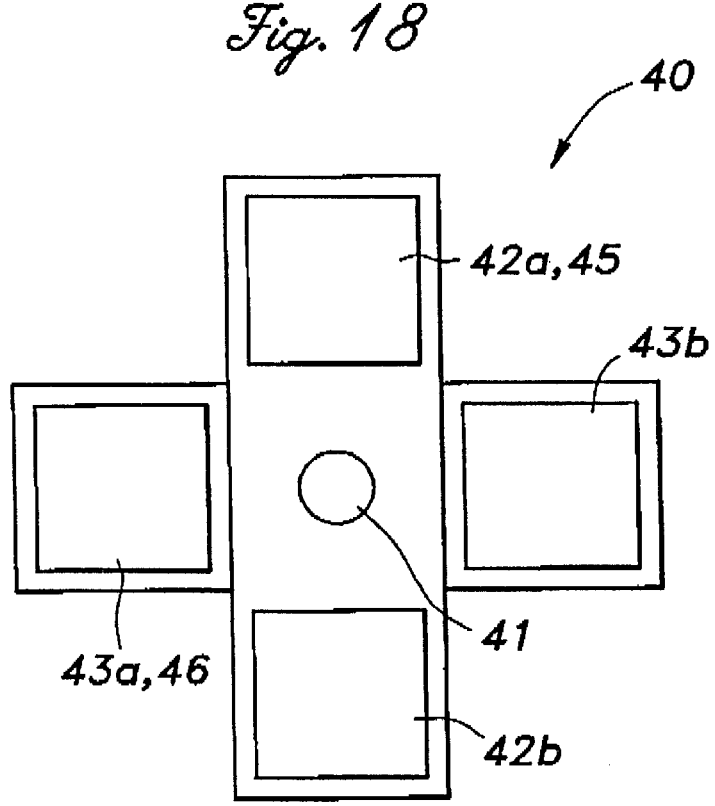
FIG. 18 is a bottom view of an identification device for the identification medium of FIG. 17.

FIG. 17 is a plan view schematically illustrating the structure of the hologram foil 31 serving as the identification medium for a seventh embodiment of the present invention, and FIG. 18 is a bottom view of an identification device 40 for this hologram foil 31. In this arrangement, a large number of rectangular small regions 31a and 31b of two different diffractive directions but of a same diffractive angle are arranged in a checkerboard pattern in an alternate fashion. These regions 31a and 31b are small enough for a spot of the light beam from a light source 41 to simultaneously cover a large number of these regions. The grid lines of the diffraction grating of the regions 31a extend perpendicularly to the scanning direction so that the incident light beam impinging upon the hologram foil in a perpendicular direction diffracts obliquely upward in the fore-and-aft direction with respect to the scanning direction, and symmetrically with respect to the incident light beam. The grid lines of the diffraction grating of the other regions 31b extend in parallel with the scanning direction so that the incident light beam impinging upon the hologram foil in a perpendicular direction diffracts laterally and obliquely with respect to the scanning direction, and symmetrically with respect to the incident light beam. The high polymer cholesteric liquid crystal layer serving as the reflective layer of the hologram foil 31 likewise only reflects right-handed circularly polarized light.

The identification device 40 is provided with two pairs of light receiving units 42a, 42b, 43a and 43b arranged in an orthogonal cross pattern centered around a light source 41. The light receiving units 42a and 42b are arranged along the scanning direction so as to receive the light diffracted from the regions 31a. The receiving units 43a and 43b are arranged perpendicular to the scanning direction so as to receive the light diffracted from the regions 31b. One of the paired light receiving units 42a is provided with a circularly polarizing filter 45 in front thereof so as to transmit only the right-handed circularly polarized light while shutting off the left-handed circularly polarized light (the first pattern). One of the other paired light receiving units 43a is provided with a circularly polarizing filter 46 in front thereof so as to transmit only the left-handed circularly polarized light while shutting off the right-handed circularly polarized light (the second pattern).

As the object X is transported and the hologram foil 31 is scanned, the first paired light receiving units 42a and 42b receive right-handed circularly polarized light from the regions 31a. This light is not shut off by the circularly polarizing filter 45 so that the intensity A of the light received by the light receiving unit 42a is substantially equal to the intensity B of the light received by the other light receiving unit 42b (A/B=1). Likewise, the second paired light receiving units 43a and 43b receive right-handed circularly polarized light from the regions 31b. This light is however totally shut off by the circularly polarizing filter 46 so that the intensity C of the light received by the light receiving unit 43a is significantly smaller than the intensity D of the light received by the other light receiving unit 43b (C/D=0). The authenticity can be thus readily determined from these results.

When the hologram or diffraction grating is not provided with a high polymer cholesteric liquid crystal layer, because the left-handed circularly polarized component of the light diffracted to the light receiving unit 42a and the right-handed circularly polarized component of the light diffracted to the light receiving unit 43a are both shut off, the intensities A and C of the light received by the light receiving units 42a and 43a are only about one half the intensities B and D of the light received by the other light receiving units 42b and 43b, respectively, (A/B≈C/D≈½).

When the hologram or diffraction grating is not provided with a high polymer cholesteric liquid crystal layer, and the shape of the diffraction grating is selected such that the diffracted light is directed only to one of the paired light receiving units, either A/B or C/D is approximately ½, instead of the relationship of A/B≈1 between the intensities A and B of the light received by the light receiving units 42a and 42b, and C/D=0 between the intensities C and D of the light received by the light receiving units 43a and 43b, respectively. The authenticity of the hologram foil 31 can be thus readily determined from these results.

The directions of diffraction in the above described embodiment were directed in the scanning direction and the direction perpendicular thereto, but it is obvious that arbitrary directions can be used. Also, three or more directions of diffraction may be selected while the paired light receiving units are arranged accordingly.

Figure 19:
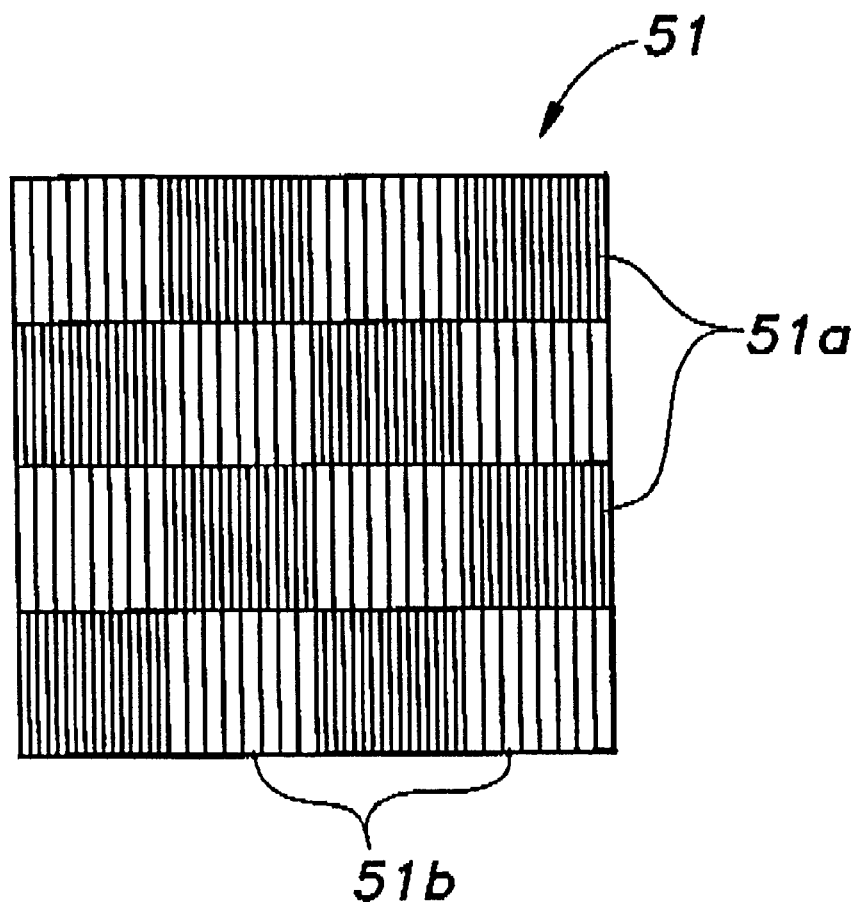
FIG. 19 is a plan view of an identification medium for an eighth embodiment of the present invention.
Figure 20:
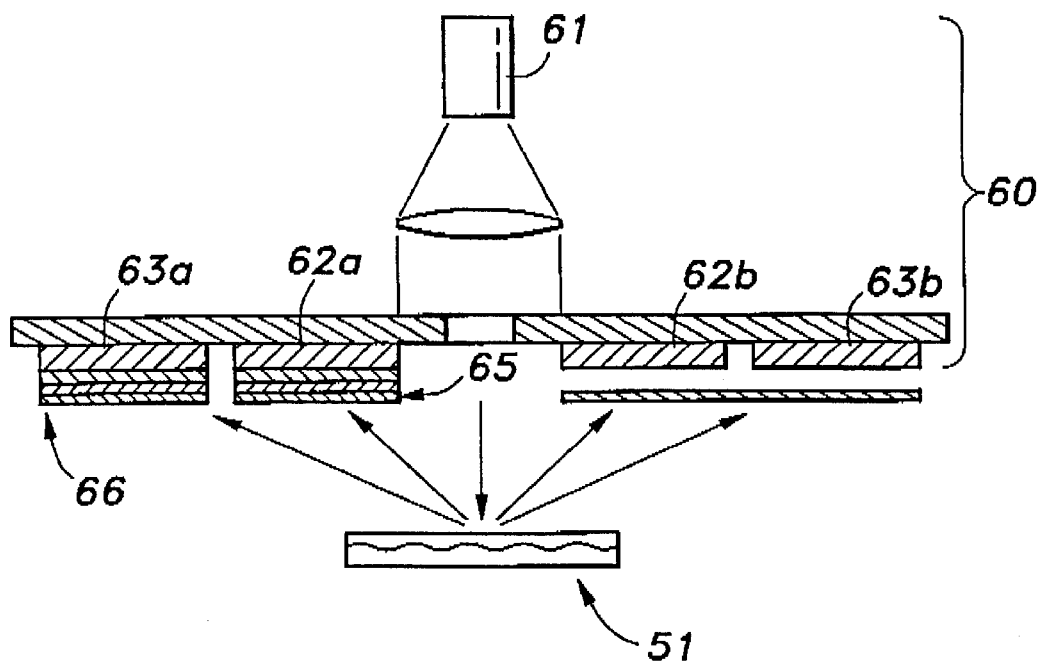
FIG. 20 is a simplified longitudinal view of the identification system for the identification medium shown in FIG. 19.
Figure 21:
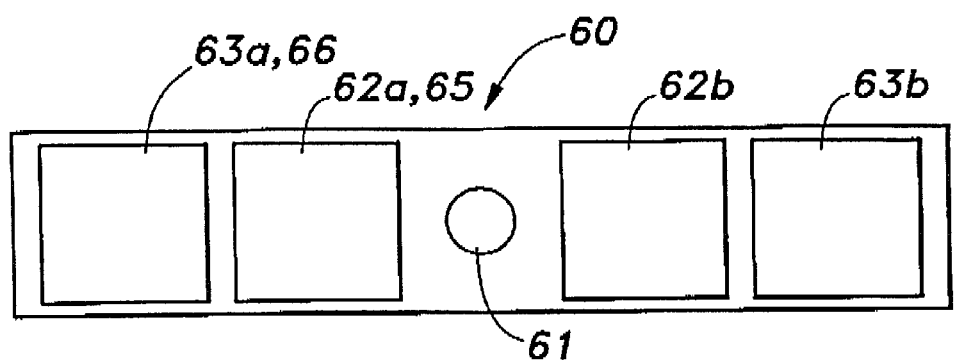
FIG. 21 is a bottom view of the identification device of the identification system shown in FIG. 20.

FIG. 19 is a plan view schematically illustrating the structure of the hologram foil 51 serving as the identification medium for an eighth embodiment of the present invention, and FIGS. 20 and 21 illustrate the identification device 60 for this hologram foil 51. In this arrangement, a large number of rectangular small regions 51a and 51b of a same diffractive direction but of different diffractive angles or of different grid pitches are arranged in a checkerboard pattern in an alternate fashion. These regions 51a and 51b are small enough for a spot of the light beam form a light source 61 to simultaneously cover a large number of these regions. The grid lines of the diffraction grating of the regions 51a extend perpendicularly to the scanning direction, similarly as the regions 31a of the previous embodiment, so that the incident light beam impinging upon the hologram foil 51 in a perpendicular direction diffracts obliquely upward in the fore-and-aft direction with respect to the scanning direction, and symmetrically with respect to the incident light beam. The grid lines of the diffraction grating of the other regions 51b give rise to a same diffraction direction as the regions 51a, but are more widely spaced than the regions 51a so that the diffracted light is angularly directed further away from the incident light beam. The high polymer cholesteric liquid crystal layer serving as the reflective layer of the hologram foil 51 in this case likewise only reflects right-handed circularly polarized light.

The identification device 60 is provided with a first pair of light receiving units 62a and 62b which are arranged along the scanning direction at mutually symmetric positions with respect to the light source 61 to receive the light diffracted from the regions 51a. A second pair of light receiving units 63a and 63b are arranged along the scanning direction at mutually symmetric positions with respect to the light source 61 on the outside of the aforementioned light receiving units 62a and 62b to receive the light diffracted from the regions 51b. One of the first paired light receiving units 62a is provided with a circularly polarizing filter 65 in front thereof so as to transmit only the right-handed circularly polarized light while shutting off the left-handed circularly polarized light (the first pattern). One of the second paired light receiving units 63a is provided with a circularly polarizing filter 66 in front thereof so as to transmit only the left-handed circularly polarized light while shutting off the right-handed circularly polarized light (the second pattern).

As the object X is transported and the hologram foil 51 is scanned, the first paired light receiving units 62a and 62b receive right-handed circularly polarized light from the regions 51a. This light is not shut off by the circularly polarizing filter 65 so that the intensity A of the light received by the light receiving unit 62a is substantially equal to the intensity B of the light received by the other light receiving unit 62b (A/B≈1). Likewise, the second paired light receiving units 63a and 63b receive right-handed circularly polarized light from the regions 31b. This light is totally shut off by the circularly polarizing filter 66 so that the intensity C of the light received by the light receiving unit 63a is significantly smaller than the intensity D of the light received by the other light receiving unit 63b (C/D≈0). The authenticity can be thus readily determined from these results.

When the hologram or diffraction grating is not provided with a high polymer cholesteric liquid crystal layer, because the left-handed circularly polarized component of the light diffracted to the light receiving unit 62a and the right-handed circularly polarized component of the light diffracted to the light receiving unit 63a are both shut off, the intensities A and C of the light received by the light receiving units 62a and 63a are only about one half the intensities B and D of the light received by the other light receiving units 62b and 63b, respectively, (A/B≈C/D≈½).

When the hologram or diffraction grating is not provided with a high polymer cholesteric liquid crystal layer, and the shape of the diffraction grating is selected such that the diffracted light is directed only to one of the paired light receiving units, either A/B or C/D is approximately ½, instead of the relationships of A/B≈1 between the intensities A and B of the light received by the light receiving units 62a and 62b, and C/D=1 between the intensities C and D of the light received by the light receiving units 63a and 63b, respectively. The authenticity of the hologram foil 51 can be thus readily determined from these results.

Two different angles of diffraction were used in the above described embodiment, but it is obvious that three or more angles of diffraction may be selected while the paired light receiving units are arranged accordingly. Also, additionally combining the variations in the directions of diffraction to the variations in the angle of diffraction further increases the number of possible variations.

Figure 22:
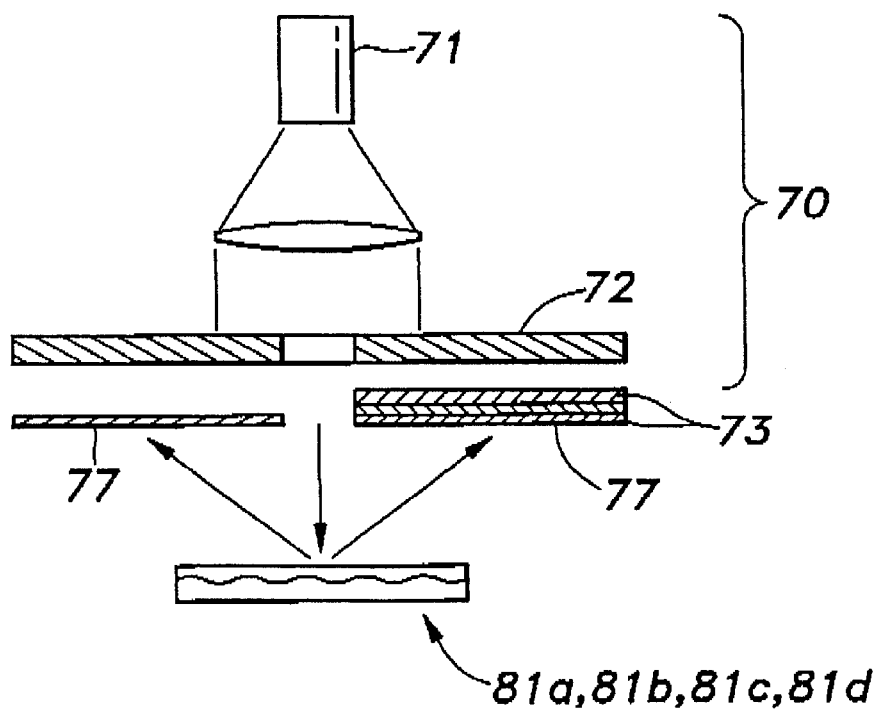
FIG. 22 is a simplified longitudinal view of a ninth embodiment of the present invention.
Figure 23:
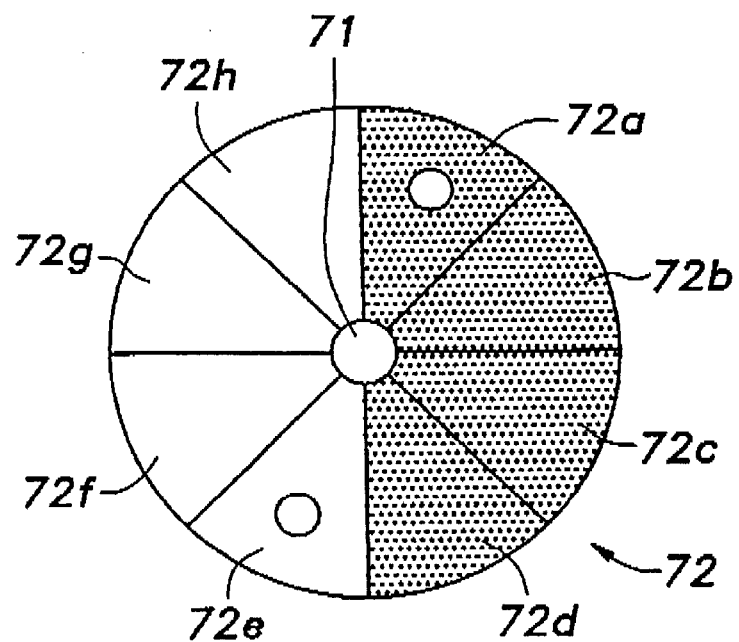
FIG. 23 is a bottom view of the identification device for the identification system shown in FIG. 22.

FIGS. 22 and 23 illustrate an identification device 70 for a ninth embodiment of the present invention. Referring to FIG. 23, the identification device 70 of this embodiment comprises a centrally placed light source 71 for emitting random light, and a disk-shaped light receiving element 72 surrounding the light source 71. This disk-shaped light receiving element 72 is divided into eight identical sector-shaped light receiving units 72a, 72b, 72c, 72d, 72e, 72f, 72g and 72h. These sector-shaped light receiving units 72a, 72b, 72c, 72d, 72e, 72f, 72g and 72h are arranged symmetrically with respect to the light source 71 and form four pairs, light receiving units 72a and 72e, light receiving units 72b and 72f, light receiving units 72c and 72g and light receiving units 72d and 72h, each pair being adapted to simultaneously receive the diffracted light from the hologram foils 81.

As also shown in FIG. 22, one of each pair of the light receiving units 72a, 72b, 72c and 72d is provided with a circularly polarizing filter 73 of the first pattern in front thereof, the circularly polarizing filter 73 transmitting only the right-handed circularly polarized light while shutting off the left-handed circularly polarized light. Additionally, a band pass filter 77 covering the entire surface of the light receiving element 72 is placed between the circularly polarizing filter 73 and the hologram foil 1.

Figure 24:
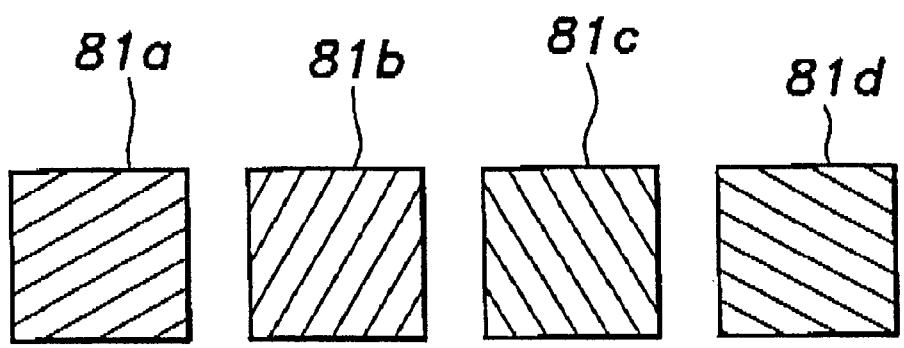
FIG. 24 is a plan view of an identification medium for the ninth embodiment of the present invention.

Referring to FIG. 24, the object X is provided with four hologram foils 81a, 81b, 81c and 81d as identification media. These hologram foils 81a, 81b, 81c and 81d are adapted to diffract light in four different directions corresponding to the four pairs of light receiving units. The high polymer cholesteric liquid crystal layer serving as the reflective layer for these hologram foils 81a, 81b, 81c and 81d reflects only the right circularly polarized light.

As the object X is transported, the hologram foils 81a, 81b, 81c and 81d are sequentially scanned. Then, the right-handed circularly polarized light is diffracted from the hologram foil 81a to the paired light receiving units 72a and 72e, for instance. Because this light is not shut off by the circularly polarizing filter 73, the intensity A of the light received by the light receiving unit 72a is substantially equal to the intensity E of the light received by the other light receiving unit 72e (A/E=1). Then, the right-handed circularly polarized light is diffracted from the hologram foil 81b to the paired light receiving units 72b and 72f, for instance. Because this light is not shut off by the circularly polarizing filter 73, the intensity B of the light received by the light receiving unit 72b is substantially equal to the intensity E of the light received by the other light receiving unit 72f (B/F≈1) Likewise, the intensity C of the light received by the light receiving unit 72c is substantially equal to the intensity G of the light received by the other light receiving unit 72g (C/G≈1), and the intensity D of the light received by the light receiving unit 72d is substantially equal to the intensity H of the light received by the other light receiving unit 72h (D/H≈1).

When a hologram or diffraction grating not provided with a high polymer cholesteric liquid crystal layer is used with the intent to emulate each of the hologram foils 81a, 81b, 81c and 81d, because the left-handed circularly polarized light is shut off from the paired light receiving units 72a and 72e, for instance, the intensity A of the light received by the light receiving units 72a is only about one half the intensity E of the light received by the other light receiving unit 72e (A/E=½). The output of one of the remaining pairs of light receiving units is also about one half of the output of the other (B/F≈½, C/G=½ and D/H=½).

In this embodiment, the hologram foil 81a is associated with the paired light receiving units 72a and 72e, the hologram foil 81b is associated with the paired light receiving units 72b and 72f, the hologram foil 81c is associated with the paired light receiving units 72c and 72g, and the hologram foil 81d is associated with the paired light receiving units 72d and 72h, but other combinations are also possible. The object X may also be provided with a larger number of hologram foils, and the light receiving element 72 may be divided into a larger number of light receiving units. The hologram foils may serve the purpose of determining ID and carrying various forms of data by using various combinations of these hologram foils. The above arrangement used only one identification device, but an even more reliable identification is possible if the light from the light source consists of circularly polarized light of two opposite senses and two identification devices are arranged along the direction of transportation as in the fourth embodiment.

The light source consisted of random light in the above described embodiments, but may also consist of laser light.

As can be appreciated from the above description, according to the system for identifying an object of the present invention, the object is affixed with an identification medium comprising a reflective layer consisting of a reflective hologram or diffraction grating which diffracts incident light from a light source onto a pair of or a plurality of pairs of symmetric positions with respect to the optical center of the incident light, the reflective layer being formed by a high polymer cholesteric liquid crystal layer, and a light beam is impinged thereon. One of a pair of diffracted light beams is received via a circularly polarizing filter consisting of a polarizing filter and a wave plate, and the other of the pair of the diffracted light beams is directly received. Alternatively, one of a pair of diffracted light beams is received via a first circularly polarizing filter having a first circularly polarizing property while the other of the pair of diffracted light beams is received via a second circularly polarizing filter having a second circularly polarizing property which is an opposite of the first circularly polarizing property. The authenticity of the object can be determined by comparing the results of receiving the light beams. Thus, the polarizing property of the cholesteric liquid crystal layer and the diffractive property of hologram are symbiotically combined so as to improve the performance of identification. Because the circularly polarized light is detected, instead of normal reflected light, undesirable influences from irregular reflections can be minimized. Also, the light beam is in effect split by the identification medium through diffraction, the identification device is not required to be provided with expensive beam splitters. Therefore, the necessary number of component parts can be minimized, compact and lightweight design of the system is made possible, and the cost is minimized.

Although the present invention has been described in terms of preferred embodiments thereof, it is obvious to a person skilled in the art that various alterations and modifications are possible without departing from the scope of the present invention which is set forth in the appended claims.

What is claimed is:

1. A system for optically identifying the authenticity of an object, comprising:

a diffraction grating affixed to an object, said diffraction grating comprising a high polymer cholesteric liquid crystal layer for a reflective layer of said diffraction grating;

a light source for impinging an incident light beam onto said diffraction grating;

a first light receiving unit placed at a position for receiving a diffracted light beam from said diffraction grating and providing an output signal;

a circularly polarizing filter placed between said first light receiving unit and said diffraction grating; and a second light receiving unit placed at a different position for receiving a diffracted light beam from said diffraction grating and providing a reference signal therefrom.

2. A system for optically identifying the authenticity of an object according to claim 1, wherein said second light receiving unit is adapted to receive said diffracted light beam without an intervention of a circularly polarizing filter.

3. A system for optically identifying the authenticity of an object according to claim 2, further comprising a second pair of light receiving units placed at positions for receiving diffracted light beams from said diffraction grating, and a circularly polarizing filter placed between only one of said second pair of light receiving units and said diffraction grating, said circularly polarizing filter for said second pair of light receiving units being opposite in sense to said circularly polarizing filter for said first light receiving unit of said first pair.

4. A system for optically identifying the authenticity of an object according to claim 3, wherein said two pairs of light receiving units are adapted to simultaneously receive diffracted light from a common spot in said diffraction grating.

5. A system for optically identifying the authenticity of an object according to claim 1, wherein a second circularly polarizing filter of an opposite sense is placed between said second light receiving unit and said diffraction grating.

6. A system for optically identifying the authenticity of an object according to claim 5, further comprising a second pair of light receiving units placed at positions for receiving diffracted light beams from said diffraction grating, and a pair of circularly polarizing filter of mutually opposite senses each placed between a corresponding one of said second pair of light receiving units and said diffraction grating.

7. A system for optically identifying the authenticity of an object according to claim 1, wherein an additional circularly polarizing filter is placed between said light source and said diffraction grating.

8. A system for optically identifying the authenticity of an object according to claim 1, wherein said diffraction grating comprises small regions having at least two different diffractive properties, said small regions being sized and distributed so that a plurality of regions including those of different diffractive properties may be simultaneously accessed by each of said light receiving units.

9. A system for optically identifying the authenticity of an object according to claim 1, further comprising a band pass filter interposed between said diffraction grating and each of said light receiving units.

* * * * *

UNITED STATES PATENT AND TRADEMARK OFFICE
CERTIFICATE OF CORRECTION

PATENT NO. : 6,301,047 B1
DATED : October 9, 2001
INVENTOR(S) : Hoshino et al.

It is certified that error appears in the above-identified patent and that said Letters Patent is hereby corrected as shown below:

Column 1,
Line 23, "$\lambda$=n-p" should read -- $\lambda = n \cdot p$ --.

Column 5,
Line 66, "(A/B=1)" should read -- (A/B $\approx$ 1) --.

Column 6,
Line 21, "(A/B=½)" should read -- (A/B $\approx$ ½) --.
Line 39, "(A/B=0)" should read -- (A/B $\approx$0) --.

Column 7,
Lines 9, 27 and 63, "(A/B=1)" should read -- (A/B $\approx$ 1) --.

Column 8,
Line 35, "(A/B=1)" should read -- (A/B $\approx$ 1) --.
Line 61, "A=1" should read -- A $\approx$ 1 --.

Column 9,
Lines 26 and 63, "(A/B=1)" should read -- (A/B $\approx$ 1) --.
Line 29, "(C/D=1)" should read -- (C/D $\approx$ 1) --.

Column 10,
Line 15, "(A/B=0)" should read -- (A/B $\approx$0) --.

Column 12,
Line 8, "(A/B=1)" should read -- (A/B $\approx$ 1) --.
Line 15, "(C/D=0)" should read -- (C/D $\approx$0) --.
Line 34, "C/D=0" should read -- C/D $\approx$0 --.

Column 13,
Line 55, "C/D=1" should read -- C/D $\approx$ 1 --.

UNITED STATES PATENT AND TRADEMARK OFFICE
CERTIFICATE OF CORRECTION

PATENT NO. : 6,301,047 B1
DATED : October 9, 2001
INVENTOR(S) : Hoshino et al.

It is certified that error appears in the above-identified patent and that said Letters Patent is hereby corrected as shown below:

<u>Column 14,</u>
Line 40, "(A/E=1)" should read -- (A/E $\approx$ 1) --.
Line 62, "(A/E=½)" should read -- (A/E $\approx$ ½) --.
Line 64, "C/G=½ and D/H=½" should read -- C/G $\approx$½ and D/H $\approx$2½ --.

Signed and Sealed this

Seventh Day of May, 2002

*Attest:*

*Attesting Officer*

JAMES E. ROGAN
*Director of the United States Patent and Trademark Office*